United States Patent
White et al.

(10) Patent No.: US 10,152,301 B2
(45) Date of Patent: *Dec. 11, 2018

(54) PROVIDING INTERFACE CONTROLS BASED ON VOICE COMMANDS

(71) Applicant: Oracle International Corporation, Redwood Shores, CA (US)

(72) Inventors: Brent-Kaan William White, San Francisco, CA (US); Burkay Gur, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 394 days.

This patent is subject to a terminal disclaimer.

(21) Appl. No.: 14/951,325

(22) Filed: Nov. 24, 2015

(65) Prior Publication Data

US 2016/0085505 A1 Mar. 24, 2016

Related U.S. Application Data

(63) Continuation of application No. 14/033,052, filed on Sep. 20, 2013, now Pat. No. 9,229,680.

(51) Int. Cl.
| | |
|---|---|
| G06K 9/00 | (2006.01) |
| G10L 15/22 | (2006.01) |
| G06F 17/28 | (2006.01) |
| G06F 17/20 | (2006.01) |
| G06F 17/27 | (2006.01) |
| G06F 3/16 | (2006.01) |
| G06F 3/0482 | (2013.01) |
| H04L 29/06 | (2006.01) |
| G10L 15/18 | (2013.01) |

(52) U.S. Cl.
CPC ............ *G06F 3/167* (2013.01); *G06F 3/0482* (2013.01); *H04L 67/42* (2013.01); *G10L 15/1822* (2013.01); *G10L 2015/223* (2013.01)

(58) Field of Classification Search
CPC ... A61B 5/7275; G02F 1/29; G02F 2001/294; G01N 1/2273; G01N 1/24
USPC ............ 382/100; 704/9, 235, 8, 2; 715/708, 715/512, 261; 707/3; 378/65; 600/407, 600/427; 703/1, 7; 700/98
See application file for complete search history.

(56) References Cited

U.S. PATENT DOCUMENTS

| | | | |
|---|---|---|---|
| 7,831,289 B2* | 11/2010 | Riker ................... | A61N 5/1031 378/65 |
| 8,205,155 B2* | 6/2012 | Trotter ................ | G06F 17/2229 715/261 |
| 2013/0103391 A1* | 4/2013 | Millmore ............... | G06Q 10/06 704/9 |
| 2014/0115456 A1 | 4/2014 | White | |

* cited by examiner

*Primary Examiner* — Charlotte M Baker
(74) *Attorney, Agent, or Firm* — Trellis IP Law Group, PC

(57) ABSTRACT

Implementations provide user access to software functionality. In some implementations, a method includes selecting one or more portions of text. The method also includes employing the one or more portions to select software functionality. The method also includes presenting one or more user interface controls in combination with a representation of the text, where the one or more user interface controls includes a user selectable outline around one or more keywords in combination with a drop-down menu.

19 Claims, 7 Drawing Sheets

PROVIDING INTERFACE CONTROLS BASED ON VOICE COMMANDS

CROSS REFERENCES TO RELATED APPLICATIONS

This application is a continuation of the following application, U.S. Pat. No. 9,229,680, entitled ENHANCED VOICE COMMAND OF COMPUTING DEVICES, issued on Jan. 5, 2016, which is hereby incorporated by reference, as if it is set forth in full in this specification.

This application is related to the following applications, U.S. patent application Ser. No. 13/842,982, entitled SYSTEM FOR ACCESSING SOFTWARE FUNCTIONALITY, filed on Mar. 15, 2013, and U.S. patent application Ser. No. 13/715,776 entitled NATURAL LANGUAGE PROCESSING FOR SOFTWARE COMMANDS, which are hereby incorporated by reference, as if set forth in full in this specification.

BACKGROUND

The present application relates to software and more specifically relates to software and accompanying graphical user interfaces that employ language input to facilitate interacting with and controlling the software.

Natural language processing is employed in various demanding applications, including hands free devices, mobile calendar and text messaging applications, foreign language translation software, mobile enterprise applications, and so on. Such applications often demand intuitive, configurable, and user friendly mechanisms for efficiently interacting with potentially complex software via language input, such as voice, to facilitate user productivity.

Efficient language based mechanisms for interacting with software are particularly important in task-rich mobile enterprise applications, where limited display area is available to facilitate user access to potentially substantial amounts of data and functionality, which may be provided via Customer Relationship Management (CRM), Human Capital Management (HCM), Business Intelligence (BI) databases, and so on.

Conventionally, mobile enterprise applications employing natural language interactions often use voice to navigate rigid predefined software flows to reach a destination screen, whereby a user may manually input data, access data, and so on. However, manual field completion of individual data fields via small mobile device displays can be cumbersome and time consuming.

Furthermore, such rigid predefined software flows and language interaction steps can be error prone, computationally expensive, and slow, especially when underlying software may require complex artificial intelligence engines to interpret natural language. In addition, the underlying software often lacks mechanisms for capturing key business terms; understanding related tasks, and so on. The accompanying user interface designs may be non-intuitive and present multiple points of potential failure. For each interaction, the software must typically accurately interpret a spoken sentence and then wait for a spoken user response. This can inhibit efficient task completion.

SUMMARY

Implementations provide user access to software functionality. In some implementations, a method includes selecting one or more portions of text. The method also includes employing the one or more portions to select software functionality. The method also includes presenting one or more user interface controls in combination with a representation of the text, where the one or more user interface controls includes a user selectable outline around one or more keywords in combination with a drop-down menu.

An example embodiment facilitates user access to data and software functionality, such as enterprise-related software applications and accompanying actions and data. The example embodiment includes receiving natural language as input; analyzing the natural language and determining one or more keywords occurring therein based on the analysis; employing the one or more keywords to select software functionality; and automatically presenting one or more user interface controls in combination with a representation of the natural language, wherein the one or more user interface controls are adapted to facilitate user access to the selected software functionality.

In an illustrative embodiment, the presenting step further includes functionally augmenting the one or more keywords, which may include phrases, sentences, paragraphs, names etc., via in-line tagging of the one or more keywords via the one or more user interface controls, resulting in functionally-augmented natural language in response thereto. The one or more user interface controls may provide plural user options for accessing software data and/or functionality associated with a single instance of natural language input, such as a note. The provided user options vary according to the content of the natural language input.

The employing step may further include referencing user data to estimate user intent, and then employing an estimation of user intent to determine software functionality to associate with each of the one or more user interface controls. The user data may be tracked. User data-access frequency and time information may be combined with other context information, such as user location information, calendar information, business cycle information, and so on, to influence what portions of the natural language are tagged and what software functionality is associated with each tag.

Various additional user options may be provided, including a user option to save functionally augmented electronic text representative of the natural language input after in-line tagging of one or more keywords of the natural language input; a user option to change the one or more selections made in the step of employing; a user option to specify a selection to be made in the step of employing, and so on.

The analyzing step may further include employing client-side user data and enterprise data to select the software functionality to associate with the one or more keywords. The software functionality may include, for example, a function to facilitate creation of a new business contact entry or opportunity, a function to facilitate modifying a database object (e.g., an object corresponding to an opportunity, business contact, customer, etc.), and so on.

In the specific example embodiment, the analyzing step further includes employing a client-side speech recognizer, such as an Automatic Speech Recognizer (ASR)), in combination with a general server-side speech recognizer to facilitate accurately converting speech signals into text. An interfacing module, e.g., a Recognition Output Voting Error Reduction (ROVER) module, interfaces the client-side ASR and the general server-side ASR to facilitate merging text strings from the different modules into enhance speech-to-text translation. The client-side speech recognizer may employ enterprise-related context information pertaining to a user to inform speech-to-text translations.

The one or more user interface controls used to augment electronic text representative of the natural language input are positioned in proximity to one or more keywords of electronic text representing the natural language input. The one or more controls may be presented via a user selectable outline around one or more keywords in combination with a drop-down menu control in proximity to the outline.

Hence, certain embodiments discussed herein facilitate efficient access to enterprise data and functionality in part by enabling accurate detection of keywords and phrases occurring in natural language input; accurate estimations of user intent based on the keywords or phrases; and pertinent associations of the keywords or phrases with software functionality, e.g., via one or more user interface controls.

Various mechanisms, including integrated NLPs coupled to sources of context information and user data, including historical data usage information, may facilitate augmenting the underlying system with vocabularies and information, including previously out-of-vocabulary words, to facilitate accurate keyword and phrase recognition and selective tagging thereof.

Conventionally, software applications that employ voice recognition to interact therewith may lack access to user data and enterprise data, including user enterprise role information. Accordingly, such software applications may lack mechanisms for leveraging the enterprise data and selecting tasks related to the natural language input. Recall that such conventional systems are typically limited to sequential user voice interactions that parallel predefined use cases or flows and that may rely upon computationally expensive artificial intelligence engines to interact with the user. However, such systems may be particularly error prone. If the software fails to interpret a particular user input, the process may fail.

Hence, embodiments discussed herein may address such shortcomings, in part by not requiring multiple user interactions and conversational exchanges with the software. Instead, embodiments discussed herein may efficiently extract meaning and estimate user intent from a single instance of natural language input, such as a spoken or written statement, including free-form notes. Free-form notes may include, for example, summaries of meetings, encounters, tasks to be completed, and so on.

Accordingly, various embodiments discussed herein are not limited to use of error-prone sequential user voice interactions. Furthermore, since a given instance of natural language input may have various tags, if one tag is incorrect or misassociated with a keyword or phrase, other properly tagged keywords or phrases may remain useful.

A further understanding of the nature and the advantages of particular embodiments disclosed herein may be realized by reference of the remaining portions of the specification and the attached drawings.

DETAILED DESCRIPTION OF EMBODIMENTS

Figure 1A:
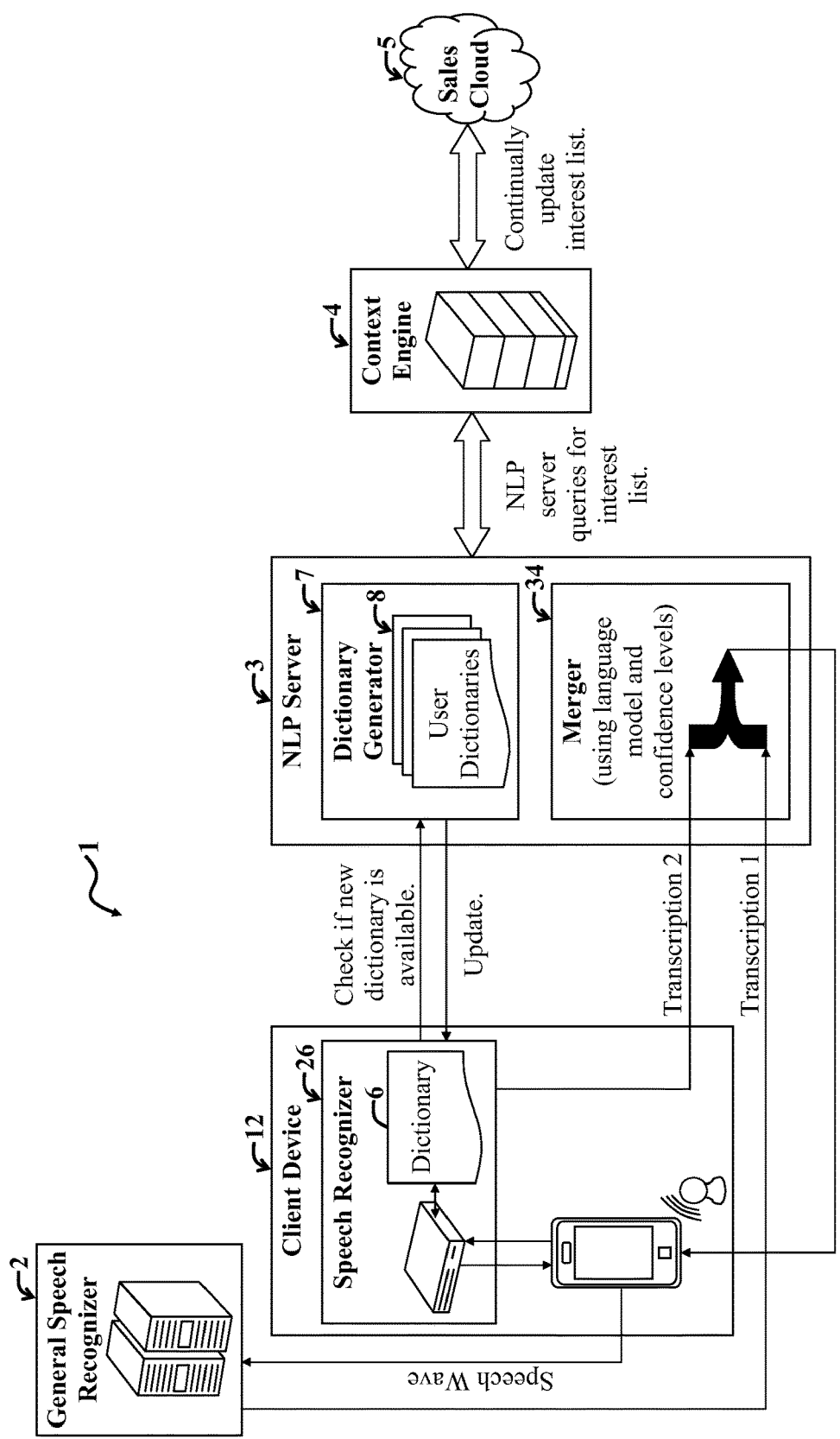
FIG. 1A is a diagram of a first example system that accepts natural language input to facilitate user interaction with ERP software via functionally augmented, i.e., tagged, natural language input.

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

An enterprise computing environment may be any computing environment used for an enterprise. A computing environment may be may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Additional examples of enterprise software include Financials, Assets, Procurement, Projects, Supply Chain, and so on. The terms "enterprise software," "enterprise software application," and "enterprise application" may be employed interchangeably herein.

Enterprise software applications, such as Customer Relationship Management (CRM), Business Intelligence (BI), Enterprise Resource Planning (ERP), and project management software, often include databases with various database objects, also called data objects or entities. For the purposes of the present discussion, a database object may be any computing object maintained by a database.

A computing object may be any collection of data and/or functionality. Examples of computing objects include a note, appointment, a particular interaction, a task, and so on. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object includes software functions or processes for issuing a reminder for an appointment.

Enterprise data may be any information pertaining to an organization or business, including information about customers, appointments, meetings, opportunities, customer interactions, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For clarity, certain well-known components, such as hard drives, processors, operating systems, power supplies, routers, Internet Service Providers (ISPs), Global Positioning System (GPS) receivers, the Internet, and so on, have been omitted from the figures. However, those skilled in the art with access to the present teachings will know which components to implement and how to implement them to meet the needs of a given implementation.

FIG. 1A is a diagram of a first example system 1 that accepts natural language input, e.g., speech input, to facilitate user interaction with enterprise software (e.g., ERP software) via functionally augmented, i.e., tagged, natural language input.

The system 1 includes a client device 12 in communication with a Natural Language Processing (NLP) server 3 and a general speech recognizer 2. The general speech recognizer 2 may be implemented on a server (e.g., server 14 of FIG. 2) or in certain implementations, client side. The NLP server 3 communicates with a context engine 4, which in turn may communicate with one or more clouds 5, such as a sales cloud, which may also be implemented via one or more servers (e.g., server 14 of FIG. 2).

The client device 12 includes a client-side speech recognizer 26 in communication with a locally-stored dictionary 6, which is adapted to periodically check a dictionary generator 7 on the NLP server 3 for updates. The NLP dictionary generator 7 maintains various user dictionaries 8, which may be adjusted for different users with reference to user-specific context information.

User-specific context information may be retrieved by the NLP server 3 from the context engine 4. The context engine 4 may continually update the context information by monitoring user data maintained via the one or more clouds 5. The one or more clouds 5 may include various types of enterprise software, including databases and associated web services that users may employ to track and adjust sales-related information, such as leads, contacts, opportunities, and so on.

In operation, a user speaks into the client device 12, which may include or represent a smartphone. The smartphone 12 forwards a speech wave, i.e., a signal containing encoded voice information, to the general speech recognizer 2 and to the client-side speech recognizer 26. The general speech recognizer 2 then references a general dictionary to facilitate translating the voice wave into a first transcription, which includes estimations of meanings of words and/or sentences represented in the input voice wave.

Similarly, the client-side speech recognizer 26 generates a second transcription with reference to the local dictionary 6. The second transcription includes estimations of meanings of words and/or sentences represented in the input voice wave. Since the client-side speech recognizer 26 employs a dictionary 6 that reflects user-specific context information (from the context engine 4 via the one or more clouds 5), as updated by the dictionary generator 7, the second transcription is informed by user-specific context information.

The first and second transcriptions are forwarded to the NLP server 3 for merging via a merger module 34. The merger module 34 is adapted to merge the first transcription derived from the general speech recognizer 2 with the second transcription derived from the client-side speech recognizer 26 using a domain-specific language model and one or more confidence levels associated with each transcription.

Figure 1B:
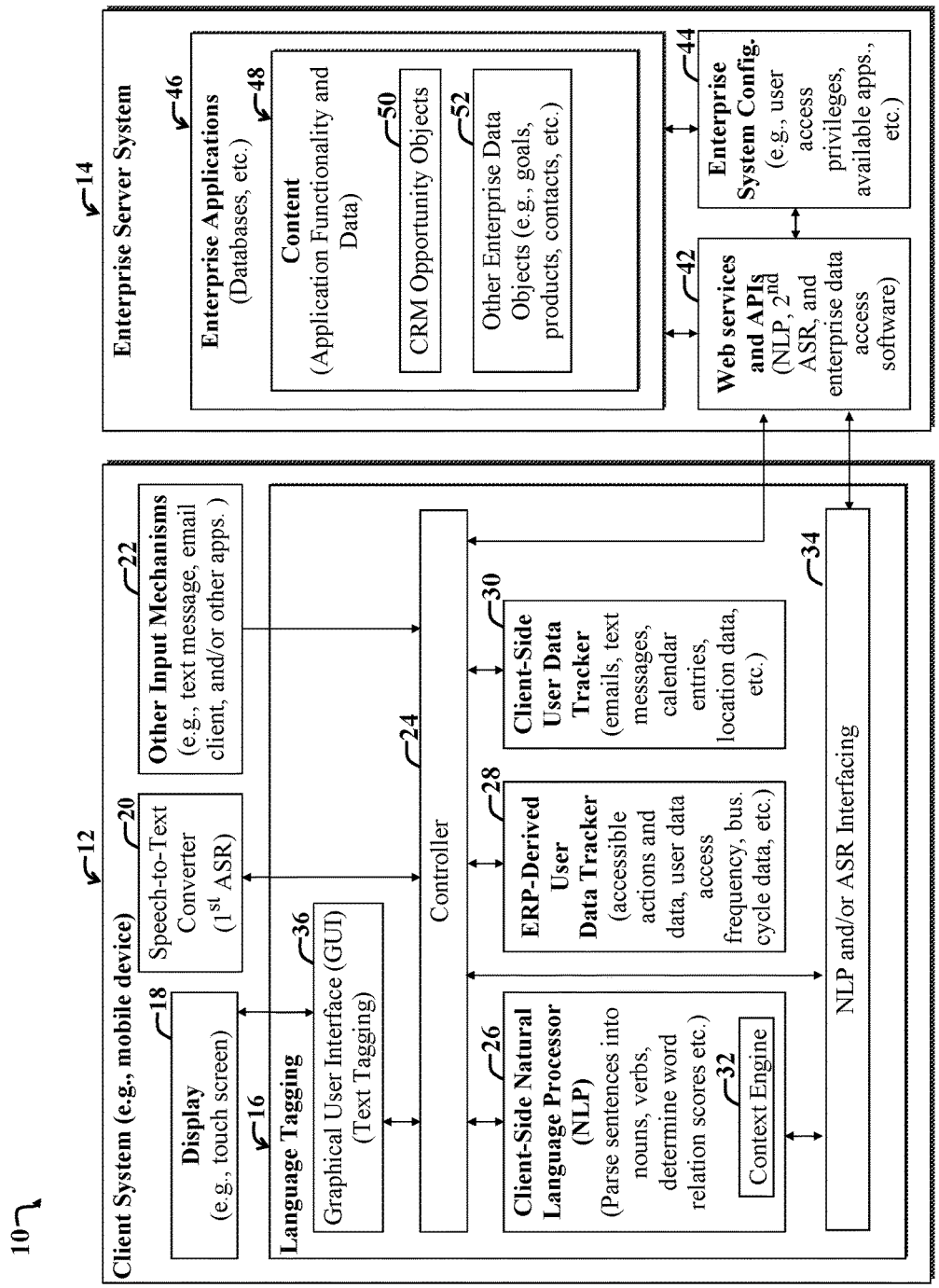
FIG. 1B illustrates an alternative representation of the system of FIG. 1, showing various different details, which may be incorporated in an implementation consistent with the system of FIG. 1.

FIG. 1B illustrates an alternative representation 10 of the system 1 of FIG. 1, showing various different details, which may be incorporated in an implementation consistent with the system 1 of FIG. 1. The example system 10 accepts natural language input to facilitate user interaction with enterprise software 46 via functionally augmented, i.e., tagged, natural language input. The example system 10 includes a client system 12 (also called the client device), such as a mobile computing device (also simply called mobile device) or desktop computer, in communication with an enterprise server system 14 via a network, such as the Internet.

The mobile device 12 includes a display 18, such as a touch screen, which facilitates user interaction with client-side language-tagging software 16. The language-tagging software 16 may receive input from various mechanisms 20, 22, such as via voice (also called speech herein), which is converted to electronic text via a speech-to-text converter (also called an Automatic Speech Recognizer (ASR)) 20, and via other mechanisms, such as software for providing text messages, emails, and so on, as input to the language-tagging software 16.

For the purposes of the present discussion, natural language may be any speech or representation of speech, i.e., spoken or written language. Similarly, natural language input may be any natural language that is provided to a computer or other system or module. Examples of natural language input usable with certain embodiments discussed herein include voice statements (which may eventually be translated to electronic text), text messages (e.g., Short Message Service (SMS) text messages), emails containing text, direct text entry, and so on.

Electronic text may be any electronic representation of one or more letters, numbers or other characters, and may include electronic representations of natural language, such as words, sentences, and so on. The terms "electronic text" and "text" are employed interchangeably herein.

A text message may be any message that includes text and that is sent via a wireless network or other telephone network, including circuit switched and/or packet switched networks used to make telephone calls. Examples of text messages include Short Message Service (SMS) messages and MultiMedia Service (MMS) messages.

The example enterprise server system 14 hosts various enterprise applications 46, such as HCM, BI, Customer Relationship Management (CRM) applications, and so on. Such applications 46 maintain content 48, which may include data and software functionality.

For the purposes of the present discussion, software functionality may be any function, capability, or feature, e.g., stored or arranged data, that is provided via computer code, i.e., software. Generally, software functionality may be accessible via use of a user interface and accompanying user interface controls and features. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

A software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an ERP software application, displaying a dialog box, and so on.

The content 48 includes, for example, CRM opportunity objects 50 and other enterprise data objects 52, such as business objects pertaining to user goals, products, contacts, job role, user data-access permissions, and so on. The content 48 is selectively accessible by the client-side language-tagging software 16 via one or more web services, Application Programming Interfaces (APIs), and so on, included in server-side software 42.

For the purposes of the present discussion, an object, such as a data object, may be any grouping of or encapsulation of data and/or functionality. Examples of objects include classes or structures implemented via object-oriented programming languages; tables, rows, or records of a database; and so on.

A business object may be any object used to organize information for business purposes. An example business object may be formed by creating a name for the business object, such as "CRM Opportunity 1" or "Goal 1" and then associating information with the name. For example, "CRM Opportunity 1" object may be associated with a conversation, one or more enterprise personnel, and so on. Data that is associated with a business object may be contained within a data structure or database associated with the object, or the information may be distributed among different applications, computers, and so on, without departing from the scope of the present teachings.

In addition to including web services and/or APIs for enabling the client system 12 to selectively access and manipulate enterprise content 48, the server-side software 42 further includes one or more web services specifically adapted to provide general Natural Language Processing (NLP) and Automatic Speech Recognition (ASR) functionality, including storage and maintenance of language vocabularies for use in interpreting natural language. Natural language, such as electronic text, may be input to the client system 12 via various mechanisms 20, 22 and then selectively forwarded to the server-side software 42 for processing, as discussed more fully below.

The enterprise server system 14 further includes an enterprise system configuration module 44 accessible to the server-side software 42 and enterprise applications 46. Enterprise privileges, permissions, and so on, associated with a user, may limit what enterprise software functionality, e.g., actions and data, a user has access to.

User access privileges to server-side enterprise data and functionality may be maintained and accessible (to other software 42, 46, 16) as part of the enterprise system configuration module 44. In certain embodiments discussed herein, user privileges and permissions are employed to inform natural language processing functionality and/or speech recognition functionality included in the server-side software 42 and/or the client-side language-tagging module 16, so as to facilitate interpreting natural language input and estimating user intent therefrom, as discussed more fully below.

The client-side language-tagging module 16 includes a controller 24 in communication with various modules 26-36, including a client-side Natural Language Processor (NLP) 26, an ERP-derived user data tracker 28, a client-side user data tracker 30, an NLP and/or ASR interfacing module 34 (also called a merger module or an NLP module depending upon whether the module 34 is acting as an ASR interfacing module and/or an NLP interfacing module, respectively), and a Graphical User Interface (GUI) module 36. The controller 16 includes computer code for coordinating communications between the various modules 20-36, including routing user input (e.g., associated with voice and user interface interactions) to appropriate modules and routing module outputs as needed for a given implementation.

For example, the controller 30 includes computer code for selectively calling software routines from the various modules 30-36 in response to user input, e.g., natural language input and/or other input from the touch screen 26, to facilitate tagging portions of natural language input with user interface controls that facilitate user access to data and software functionality and for generating associated user interface display screens, as discussed more fully below. The controller 30 may also include computer code for facilitating communicating with the enterprise applications 46 via the server-side software 42. Communications may include issuance of data requests by the language-tagging module 16 to the enterprise applications 46, and receipt of responses therefrom.

The client-side NLP 26 includes computer code adapted to analyze natural language input, e.g., from various input mechanisms 18-22, with reference to locally stored ERP-derived user data maintained via the ERP-derived user data tracker 28 and locally stored data derived from usage of the client device 12 maintained via the client-side user data tracker 30.

The client-side NLP 26 further includes a context engine 32, which includes computer code for communicating with client-side software and modules, such as calendar applications, email clients, text message clients, GPS receivers, data trackers 28, 30, and so on, to collect context information. Example context information includes user location information, calendar information (e.g., current date and time), calendar software notes and appointments, and business cycle information. Such context information may represent additional information (in addition to the natural language input itself) usable by the NLP processors 26, 42 and controller 24 to make inferences about meanings of natural language occurring in electronic text, such as voice-entered notes.

Note that the client-side NLP 26 may be implemented on the enterprise server system 14, without departing from the scope of the present teachings. In general, various modules may be omitted from the system 10; combined with other modules; or otherwise repositioned or distributed in the system 10, without departing from the scope of the present teachings. For example, in certain implementations, the controller 24 may be implemented as part of the client-side NLP module 26; the user data trackers 28 and context engine 32 may be integrated and run client-side or server-side, and so on.

For the purposes of the present discussion, context information may be any information that may be employed to inform natural language processing and/or speech-to-text translating (i.e., speech recognizing) to estimate user intent or meaning of natural language or portions thereof. User intent of a portion of natural language is said to be estimated if a meaning is associated with or attributed to the portion of natural language. Accordingly, context information includes any information pertaining to natural language input, including, but not limited to user data, such as user location information, calendar entries, appointments, business cycle information, and so on.

A natural language processor may be any collection of functionality, such as provided, in part, via software that is adapted to analyze natural language to extract information thereabout. Accordingly, a natural language processor may include software and/or hardware for interpreting natural language, translating the natural language into one or more software commands or otherwise identifying meanings or associations between natural language content and one or more computing objects. An automatic speech recognizer may be any speech-to-text converter that is adapted to translate a voice wave or signal into electronic text, which may include keywords and phrases that are associated with computing objects and/or software functionality.

The ERP-derived data tracker 28 includes computer code for selectively communicating with the server-side software, e.g., web services 42, to retrieve content 48 from the server-side enterprise applications 46. The tracked data may include information indicating what enterprise software actions and data are accessible to the user via the client device 12; information about how often and when a user accesses a particular business object (e.g., data access frequency and timing information); information about projects, tasks, goals, opportunities associated with the user, and so on.

The client-side user data tracker 30 includes computer code for selectively collecting and/or accessing or storing data from various client-side data sources, such as emails, text messages, calendar application entries, location information, and so on. Information collected via the trackers 28, 30 may be accessed by the context engine of the client-side NLP 26 to facilitate estimating likely meanings (e.g., user intent) of keywords occurring in natural language input and for selecting software functionality to associate with the keywords and/or associated phrases.

For the purposes of the present discussion, a keyword may be any word or phrase that is associated with a database object or otherwise identifies or is representative of something, such as a noun, that may be associated with a database object, user interface control, or software functionality, either presently or in response to user or software action.

The NLPs 26, 42 may include computer code for implementing functionality for identifying keywords, phrases, paragraphs, and so on, in natural language input, which are associated with business objects. The controller 24 may further include computer code for determining selected portions of natural language input (e.g., communication with the NLPs 26, 42 and NLP interfacing module 34); for selecting software functionality to be associated or assigned to tags to be applied to the selected portions of natural language input; for assigning software functionality to the tags; and for implementing the software functionality, e.g., software actions in response to user interaction with the tags.

For the purposes of the present discussion, a tag may be any mechanism for distinguishing a portion of natural language, e.g., one or more keywords, from other natural language, and for providing a user interface control in association with the distinguishing mechanism.

The controller 24 may reference context information from the user data trackers 28, 30 and contextual engine 32 to facilitate selecting software functionality to assign to portions of natural language based on interpretations of natural language provided via the NLP interfacing module 34 to the controller 24. Alternatively, such selection functionality may be implemented, in whole or in part, via one or more web services of the server-side software 42 or may otherwise be included in a different module or distributed among modules of the system 10. Alternatively, or in addition, selections may be manually specified and/or configured by a user.

Accordingly, the language-tagging software 16 is adapted to access enterprise data in one or more databases 46 and to employ client-side user data and the enterprise data to select software functionality to associate with the selected one or more keywords, i.e., to functionally augment natural language input via in-line tagging.

Selecting or isolating a portion of natural language input refers to selecting or choosing one more words or collections thereof, such as particular words, phrases, keywords, sentences, and so on. For example, isolated portions of natural language input may include names or phrases referring to business objects, such as names of business objects corresponding opportunities, customers, and so on. Such isolated portions are said to include one or more keywords.

For the purposes of the present discussion, a word is said to be functionally augmented if it is associated with a software action, such as via highlighting or other method for marking or tagging a word to indicate functionality associated with the word, e.g., functionality represented by the software action. In-line tagging of a word may be any method of distinguishing a word from other words in a sentence or paragraph, where the distinguishing mechanism or feature is associated with other words, data, and/or software functionality.

A sentence, paragraph, collection of paragraphs, and so on, may represent a single instance of natural language input. A single instance of natural language input may be any natural language that is input in one field or document or was otherwise supplied in one input operation, such as one instance of speaking, typing, or otherwise entering or providing of a word, sentence, paragraph, and so on, to a module, system, device or other mechanism adapted to receive the input. The terms "single natural language input" and "single instance of natural language input" are employed interchangeably herein. Various embodiments discussed herein are adapted to functionally augment single instances of natural language input via in-line tagging of portions of the natural language input.

The NLP interfacing module 34 communicates with the client-side NLP 26 and server-side NLP software 42 to facilitate analyzing natural language input and to facilitate estimating user intent represented via the natural language input. The NLP interfacing module 34 includes computer code for merging language analysis results from the client-side NLP 26 and the NLP engine of the server-side software 42 via an algorithm for determining which output (i.e., from module 26 and/or 42) provides a more robust interpretation of a meaning of particular words and phrases in the natural language input.

Note that the NLP interfacing module 34 may also implement functionality for merging text strings (or other transcriptions) output from the client-side speech-to-text converter (i.e., first ASR) 20 and one or more ASR web services (e.g., as may be included among the server-side web services 42) implementing a server-side speech-to-text converter (i.e., second ASR or general ASR). Text strings output from the first ASR 20 may reflect use of a dictionary that is updated with context information, e.g., from the data trackers 28, 30 and/or via one or more of the web services 42. Text strings output from one or more server-side ASRs implemented via the web services 42 reflect use of a generalized or standard dictionary. The resulting merged text may then be further analyzed via NLP functionality that may be implemented via the NLP interfacing module 34.

When implementing NLP functionality, in certain instances, certain words may be unknown to the client-side NLP 26 but known to the server-side NLP 42, and vice versa. In such cases, the NLP interfacing module 34 can associate a meaning to a given word or phrase if a meaning is provided by one or more of the NLP modules 26, 42.

In cases where both NLP modules 26, 42 provide an interpretation of a word or phrase, the NLP interfacing module 34 may, by default, select the meaning determined by the client-side NLP 26. Alternatively, or in addition, the NLP interfacing module 34 analyzes both outputs from the NLP modules 26, 42 and makes a meaning interpretation decision based on knowledge as to which NLP module 26, 42 is better suited to make a more accurate language interpretation. Alternatively, or in addition, the NLP interfacing module 34 employs both language interpretations provided by the NLP modules 26, 42 to generate a new language interpretation.

Note that conventionally, ASRs lacked efficient mechanisms for adding new words and for accurately recognizing the words in natural language input; particularly speech input. Use of the NLP interfacing module 34 to switch between or combine speech analysis functionality of plural ASRs (e.g., blocks 20 and 42) and plural NLP modules 26, 42 may facilitate dynamic updating of speech domain vocabulary as the vocabulary employed by a user changes.

The three NLP modules 26, 34, 42 are adapted to facilitate recognizing proper nouns in natural language and then adding any new nouns to language vocabulary databases as the new nouns are determined.

The three NLP modules 26, 34, 42 may act as a hybrid ASR that intelligently combines two powerful NLPs 26, 42 (also called ASRs herein). The server-side ASR 42 may represent a general purpose speech recognizer that is used, when needed, as a web service by all mobile clients that a given user, such as an enterprise sales representative, employs. The general purpose server-side ASR 42 may be a preexisting off-the-shelf ASR or may be custom. In general, both the server-side ASR 42 and the client-side ASR 26 may be custom modules, the exact functionality of which may vary depending upon the needs of a given implementation.

In the present example embodiment, the client-side ASR 26 is a custom general purpose ASR 42 that specializes in transcribing proper nouns that are defined by a language grammar. The grammar is constructed using user data derived from the enterprise server system 14 and data derived from the client device 12, including, user's contacts (e.g., locally stored contacts on the client device 12 and/or enterprise contacts maintained via one or more of the enterprise applications 46), details pertaining to user interactions with other persons or entities (e.g., as maintained via interactions objects extracted from enterprise databases 46), emails, text messages, calendar entries, products worked with, companies worked with, opportunities, goals, tasks, teams to which the user belongs, and so on. Accordingly, the client-side ASR 26 facilitates leveraging an understanding of not only what business data is accessed, but how business data is accessed (e.g., frequency, time, variability) and further facilitates leveraging additional context information such as location, calendar and business cycle information, and so on, to better identify keywords and tasks.

Switching between and combining these ASRs 26, 42 may be done via a ROVER method for recognizing and extracting information about entities, such as opportunity contacts, companies, and products, referenced in natural language input. Use of such NLP integration may enable enhanced NLP accuracy and performance, enabling, for example, the system 10 to distinguish between the name of a person and a company with similar names.

The context engine 32, also called a contextual engine, facilitates incorporating knowledge, e.g., context information obtainable about the user, to facilitate making inferences about natural language, such as notes entered via voice and translated via the speech-to-text converter 20 for input to the language-tagging module 16.

Note that many conventional or existing software applications that employ natural language input to facilitate user interaction with software lack efficient mechanisms to understand business domains and are unable to link or tie enterprise tasks with the voice application. The system 10 is adapted to use context information about the user's enterprise role and their data to effectively capture the key business terms and understand what the related tasks are.

Figure 2:
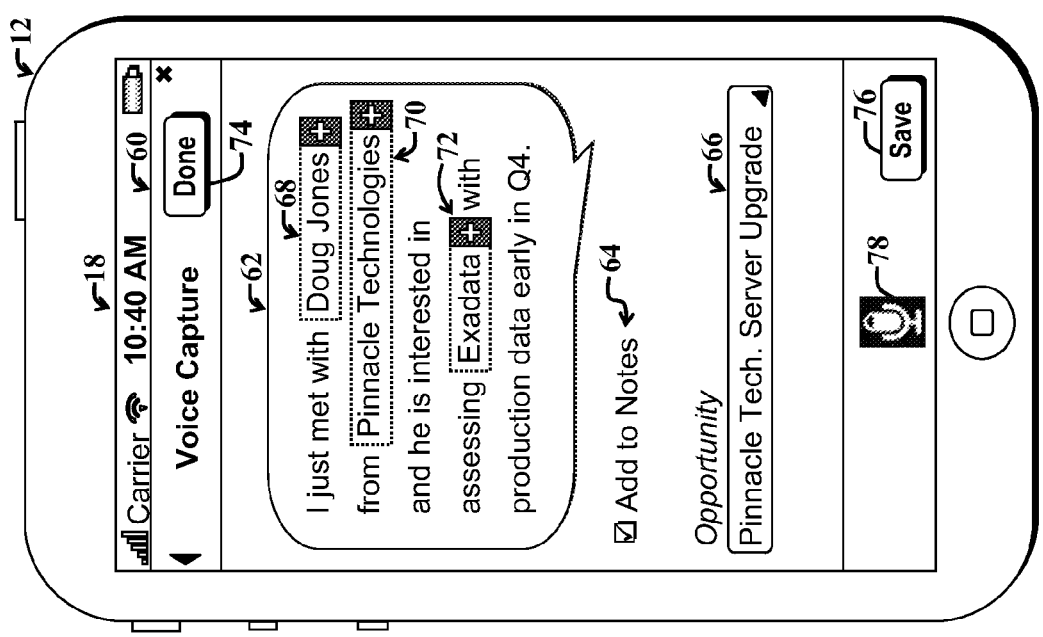
FIG. 2 illustrates a first example user interface display screen, which may be implemented via the system of FIG. 1B, and which illustrates tagged natural language input.

FIG. 2 illustrates a first example user interface display screen 60 illustrated on a mobile device touchscreen display 18, which may be implemented via the system 10 of FIG. 1B, and which illustrates tagged natural language input 62, which represents tagged electronic text.

The present example embodiment illustrates an example use case, wherein a user has spoken a note corresponding to the tagged natural language input 62 after pressing a voice-recording button 78. With reference to FIGS. 1 and 2, resulting spoken language is then recorded and translated to electronic text, e.g., via the speech-to-text converter 20 of FIG. 1B. The electronic text is then analyzed for keywords that are associated with business objects, e.g., via the NLP modules 26, 34, 42 and controller 24 of FIG. 1B.

Keywords or phrases in the analyzed electronic text are selected or isolated and then augmented, i.e., tagged, with functionality and data associated with the electronic text. Accordingly, the tagged electronic text 62 includes various tags 68-72 distinguishing keywords and phrases, such as Doug Jones, Pinnacle Technologies, and Exadata, which have been tagged with a first tag 68, a second tag 70, and a third tag 72, respectively.

The tags 68-72 represent user interface controls comprising user selectable outlines around portions of natural language input, i.e., around groups of one or more keywords. For the purposes of the present discussion, a user interface control may be any displayed element or component of a user interface display screen, which is adapted to enable a user to provide input, view data, and/or otherwise interact with a user interface. Additional examples of user interface controls include drop down menus, menu items, tap-and-hold functionality (or other touch gestures), and so on. Similarly, a user interface control signal may be any signal that is provided as input for software, wherein the input affects a user interface display screen and/or accompanying software application associated with the software.

The user interface controls 68-72 act as drop-down menu controls, which may be selected to display associated drop-down menus. The drop-down menus may include various user options for accessing data, modifying data, creating new business objects to be associated with tagged text, and so on, as discussed more fully below.

Note that the exact types of user interface controls used (e.g., drop-down menus) and user options provided thereby, are implementation specific and may vary, depending upon the needs of a given implementation. For example, the controls 68-72 may be implemented via hyperlinks or other tagging mechanisms.

A link or hyperlink may be any control, such as a button, text, or image map, that enables a user to access another user interface display screen or additional functionality or data. For example, user selection of a hyperlink may trigger display of a website, newsgroup, or location, such as a spatial and/or temporal location in a video or document, identified by the control. Certain hyperlinks may represent or otherwise be associated with Uniform Resource Locators (URLs).

Furthermore, note that various user options provided via the tags 68-72 may dynamically change as underlying meanings associated with different portions of natural language change. Furthermore, in certain implementations, drop-down menus that may be activated via the tags 68-72 provide additional user options for changing user options available in the drop-down menus and for changing or specifying system associations between tagged keywords and underlying business objects and associated data and functionality.

In this sense, the underlying information architecture employed to render the tagged natural language input 62 (e.g., as may be rendered via the GUI module 36 of FIG. 1B) may automatically dynamically adjust and/or may be user adjustable to accommodate changing or evolving use of the underlying system. For the purposes of the present discussion, an information architecture of a software application or set of software functionality may be any method or organization (e.g., organization of user interface controls and associated functionality) for enabling or facilitating user interaction with the software application.

The example user interface display screen 60 includes various additional user options and associated user interface controls (in addition to the tags 68-72), including an add-to-notes control 64, an opportunity-selection control 66, a save button 76, and a done button 74.

The add-to-notes control 64 is implemented via a check box control that facilitates adding the tagged natural language input 62, along with the tags 68-72, to a notes file in response to user selection of the done button 74. If the add-to-notes control 64 is unchecked, and the done button 74 is selected, the tagged natural language input 62 may be discarded (unless the save button 76 was first selected), but not without first having implemented any modifications to database objects effectuated via user interaction with user options provided via the tags 68-72. If the add-to-notes control 64 is unchecked, and a user selects the save button 76, the tagged electronic text 62 may be saved in a separate file that is different from a notes file that aggregates previously created notes.

The opportunity-selection control 66 represents a combination user interface control that acts as both a user-modifiable field and a drop-down menu control. For example, in certain implementations, a user may activate the drop-down menu of the control 66 by selecting the lower right corner of the control 66, and may then select a different opportunity from a resulting list of one or more opportunities.

Note that in the present example embodiment, the user is working on a particular opportunity, i.e., Pinnacle Technologies Server Upgrade. A user may have preselected the opportunity identified in the opportunity-selection control 66. Alternatively, the underlying system may have automatically inferred the opportunity from the natural language input 62. Note that information pertaining to different opportunities may be stored in different business objects, called opportunity objects, which may be maintained via the enterprise applications 46 of FIG. 1B.

User selection of an opportunity may inform the underlying system to facilitate interpreting and tagging the natural language input 62. Note that if a user wishes to change an opportunity associated with the natural language input 62, a user may select the field of the opportunity-selection control 66 and type or otherwise enter, i.e., specify, the opportunity. If the specified opportunity does not exist, the system may prompt the user as to whether to create a new opportunity based on the specified opportunity. Alternatively, the user may select an opportunity from the drop-down menu of the opportunity-selection control 66.

Note that, while in the present example embodiment, additional user interface controls, i.e., the add-to-notes control 64 and the opportunity-selection control 66, are provided separately from the tagged natural language input 62. However, in other implementations, such controls 64, 66 or related controls may be included in or otherwise activated via user interface controls accessible directly via one or more of the tags 68-72.

Figure 3:
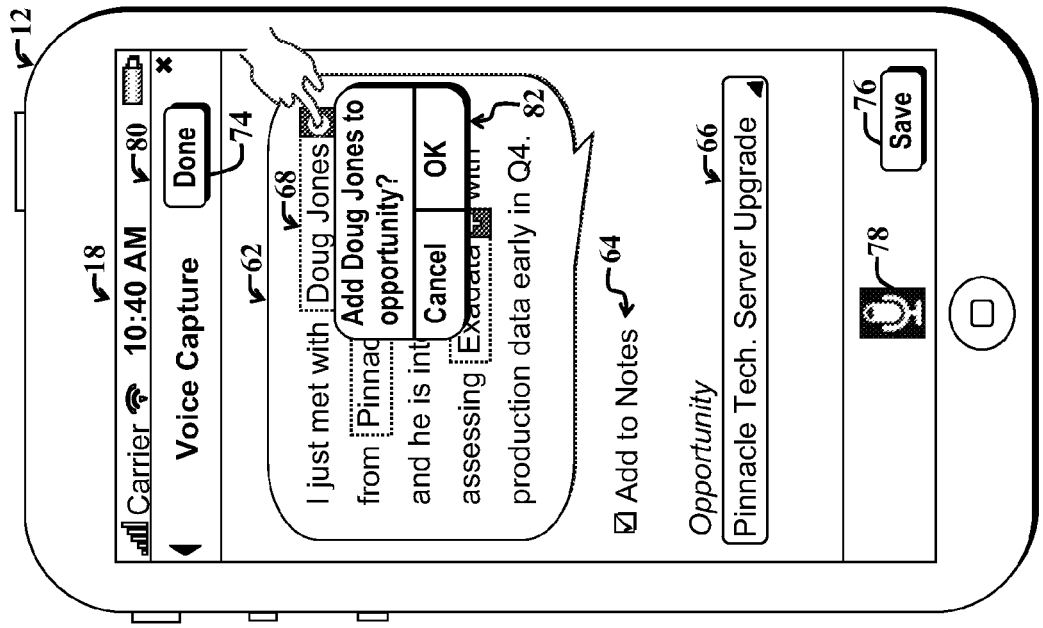
FIG. 3 illustrates a second example user interface display screen presenting an example drop-down menu with various user interface controls, and which is activated via a first keyword tag shown in the first user interface display screen of FIG. 2.

FIG. 3 illustrates a second example user interface display screen 80 presenting an example drop-down menu 82 with various user interface controls, and which is activated via a first keyword tag 68 shown in the first user interface display screen 60 of FIG. 2. Accordingly, the user interface display screen 80 is similar to the user interface display screen 60 of FIG. 1B with the exception that the drop-down menu 82 has been activated.

The example first tag drop-down menu 82 prompts the user to add a name, i.e., Doug Jones, associated with the tagged text to the current opportunity illustrated via the opportunity-selection control 66. If the user selects "Cancel," then the second user interface display screen 80 transitions back to the first user interface display screen 60 shown in FIG. 2. If the user selects "OK," then the second user interface display screen 80 transitions to a third user interface display screen 90, as shown in FIG. 4.

Figure 4:
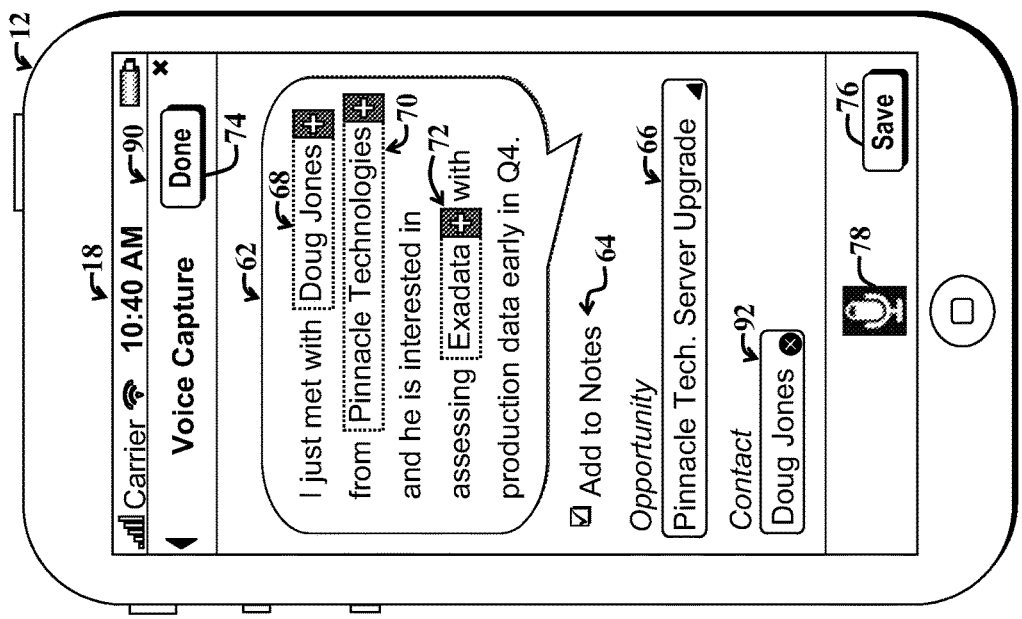
FIG. 4 illustrates a third example user interface display screen showing the user interface display screen of FIG. 3 after a user has employed a user interface control to add a contact corresponding to a selected name occurring in the natural language input.

FIG. 4 illustrates the third example user interface display screen 90 showing the user interface display screen 80 of FIG. 3 after a user has employed a user interface control 82 to add a contact corresponding to a selected name (Doug Jones) occurring in the natural language input 62.

The underlying system detects that Doug Jones represents a contact name to be added to the specified opportunity, i.e., the Pinnacle Technologies Server Upgrade opportunity. Accordingly, a new contact user interface control 92 appears below the opportunity-selection user interface control 66, indicating that Doug Jones is a contact associated with the identified opportunity. A user may remove Doug Jones as a contact associated with the Pinnacle Technologies Server Upgrade opportunity by simply selecting a close button provided via the contact user interface control 92.

By adding Doug Jones to the Pinnacle Technologies Server Upgrade opportunity, the user has effectively triggered modification of the business object corresponding to the opportunity. Accordingly, certain user interface controls provided herein may provide user options for enabling user modification of database objects, including opportunities, business contacts, customers, sales accounts, and so on.

Note that some of the natural language input 62 is not tagged. If a user wishes to tag portions of the natural language input 62, certain implementations may enable a user to select a word or phrase, e.g., via a tap-and-drag-and-hold touch gesture. The tap-and-drag-and-hold touch gesture may trigger display of a menu with user options for tagging the selection, including options for selecting data and/or functionality (e.g., as provided via one or more user options) to be accessible via a newly created tag, and/or for selecting a pre-existing tag to be applied to the selected portion of natural language text.

Figure 5:
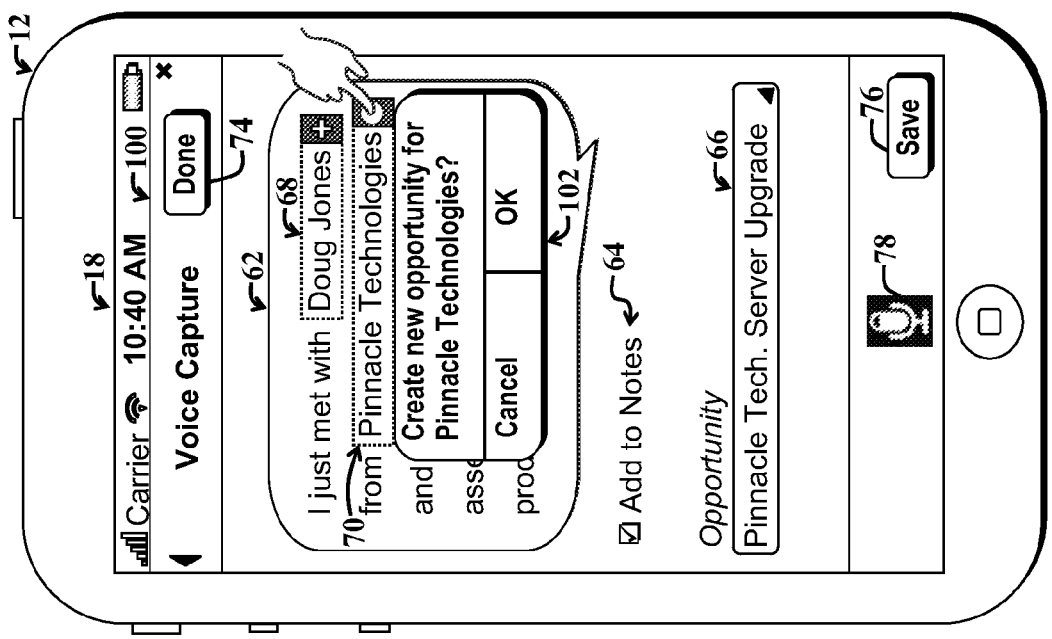
FIG. 5 illustrates a fourth example user interface display screen presenting an example drop-down menu with various user interface controls, and which is activated via a second keyword tag shown in the first user interface display screen of FIG. 2.

FIG. 5 illustrates a fourth example user interface display screen 100 presenting an example drop-down menu 102 with various user interface controls, and which is activated via the second keyword tag 70. The resulting displayed drop-down menu 102 prompts the user to specify whether or not to create a new opportunity to associate with the keywords (Pinnacle Technologies) tagged via the second tag 70 (also shown in FIGS. 2 and 4).

In the present example embodiment, a user selects "OK" to trigger creation of a new opportunity for Pinnacle Technologies. The fourth user interface display screen 100 then transitions to a fifth user interface display screen 110 shown in FIG. 6.

Figure 6:
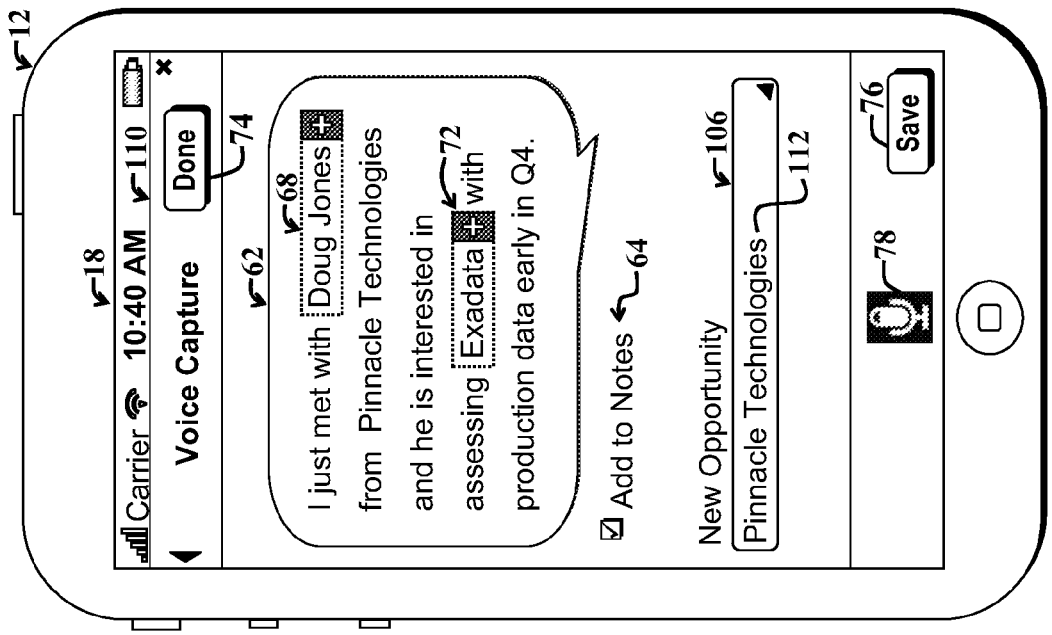
FIG. 6 illustrates a fifth example user interface display screen showing the user interface display screen of FIG. 5 after a user has employed a user interface control to create an opportunity object corresponding to a selected opportunity name occurring in the natural language input.

FIG. 6 illustrates the fifth example user interface display screen 110 showing the fourth user interface display screen 100 of FIG. 5 after a user has employed a user interface control 102 to create an opportunity object corresponding to a selected opportunity name (Pinnacle Technologies) occurring in the natural language input 62.

In the fifth example user interface display screen 110, the opportunity-selection control 66 of FIG. 5 is updated, resulting in display of an updated control 106. The updated control illustrates that a new opportunity has been created, which is identified via text 112 corresponding to the previously tagged text (Pinnacle Technologies) associated with the second tag 70 shown in FIGS. 2 and 3. The tagged text 62 is updated by removing the tag 70 from the keywords "Pinnacle Technologies."

Figure 7:
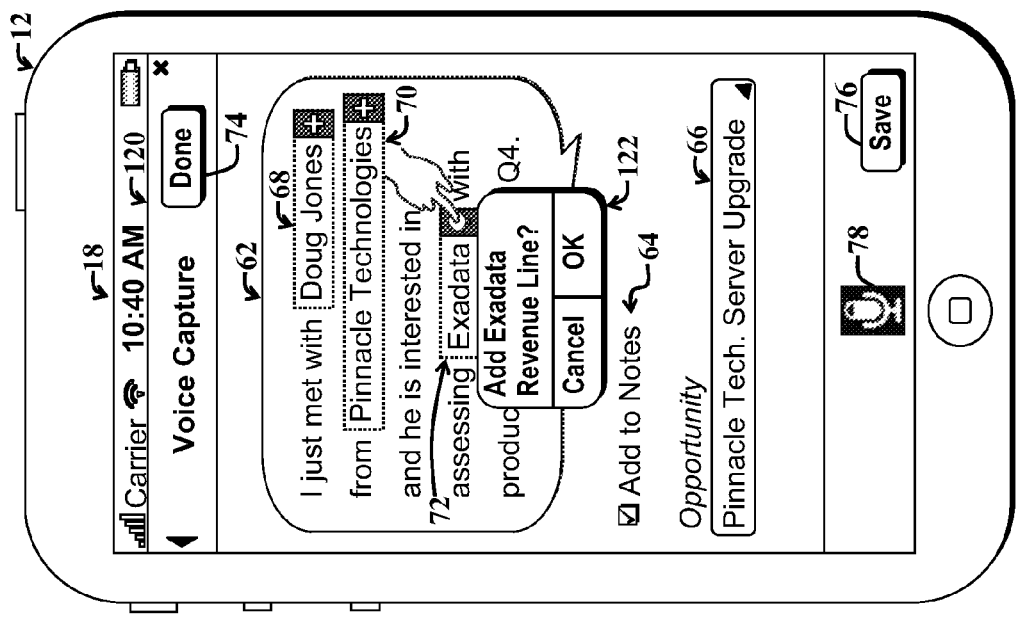
FIG. 7 illustrates a sixth example user interface display screen presenting an example drop-down menu with various user interface controls, and which is activated via a third keyword tag shown in the first user interface display screen of FIG. 2.

FIG. 7 illustrates a sixth example user interface display screen 120 presenting an example drop-down menu 122 with various user interface controls, and which is activated via the third keyword tag 72. The displayed drop-down menu 122 prompts the user to specify whether or not to add a revenue line to a business object associated with the keyword (Exadata) tagged via the third tag 72.

In the present example embodiment, a user selects "OK" to trigger creation of a new revenue line for Exadata. The sixth user interface displays screen 120 then transitions to a seventh user interface display screen 130 shown in FIG. 8.

Figure 8:
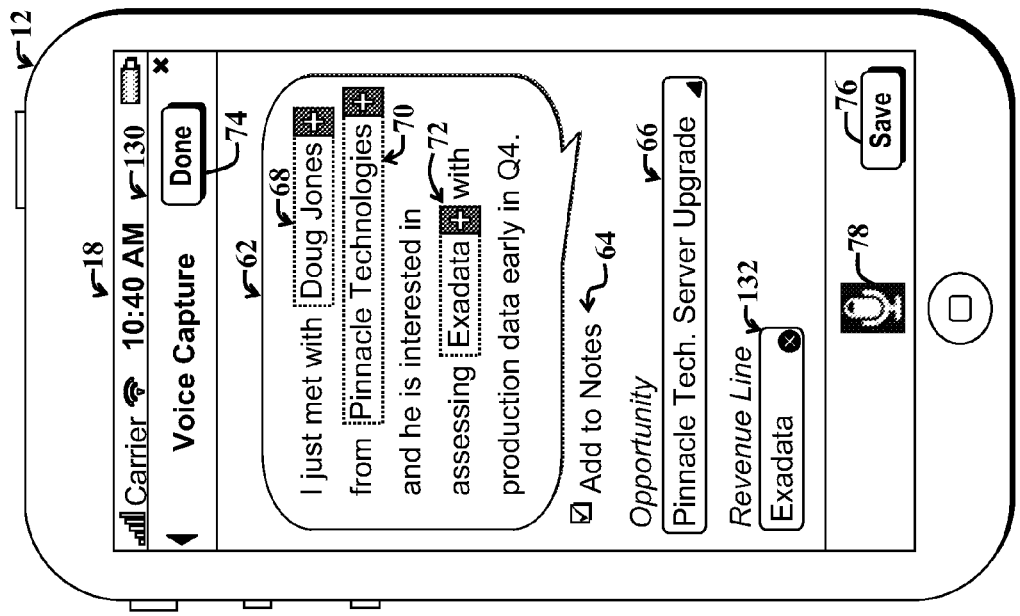
FIG. 8 illustrates a seventh example user interface display screen showing the user interface display screen of FIG. 7 after a user has employed a user interface control to add a revenue line corresponding to a selected product name occurring in the natural language input.

FIG. 8 illustrates the seventh example user interface display screen 130 showing the user interface display screen of FIG. 7 after a user has employed a user interface control 122 to add a revenue line corresponding to a selected product name (Exadata) occurring in the natural language input 62.

The seventh example user interface display screen 130 is updated to show a new revenue-line user interface control 132 appearing below the opportunity-selection user interface control 66, and indicating that "Exadata" represents a product that is associated with the identified opportunity, i.e., Pinnacle Technologies Server Upgrade. A user may remove Exadata as a revenue line associated with the Pinnacle Technologies Server Upgrade opportunity by simply selecting a close button provided via the revenue-line user interface control 132.

Figure 9:
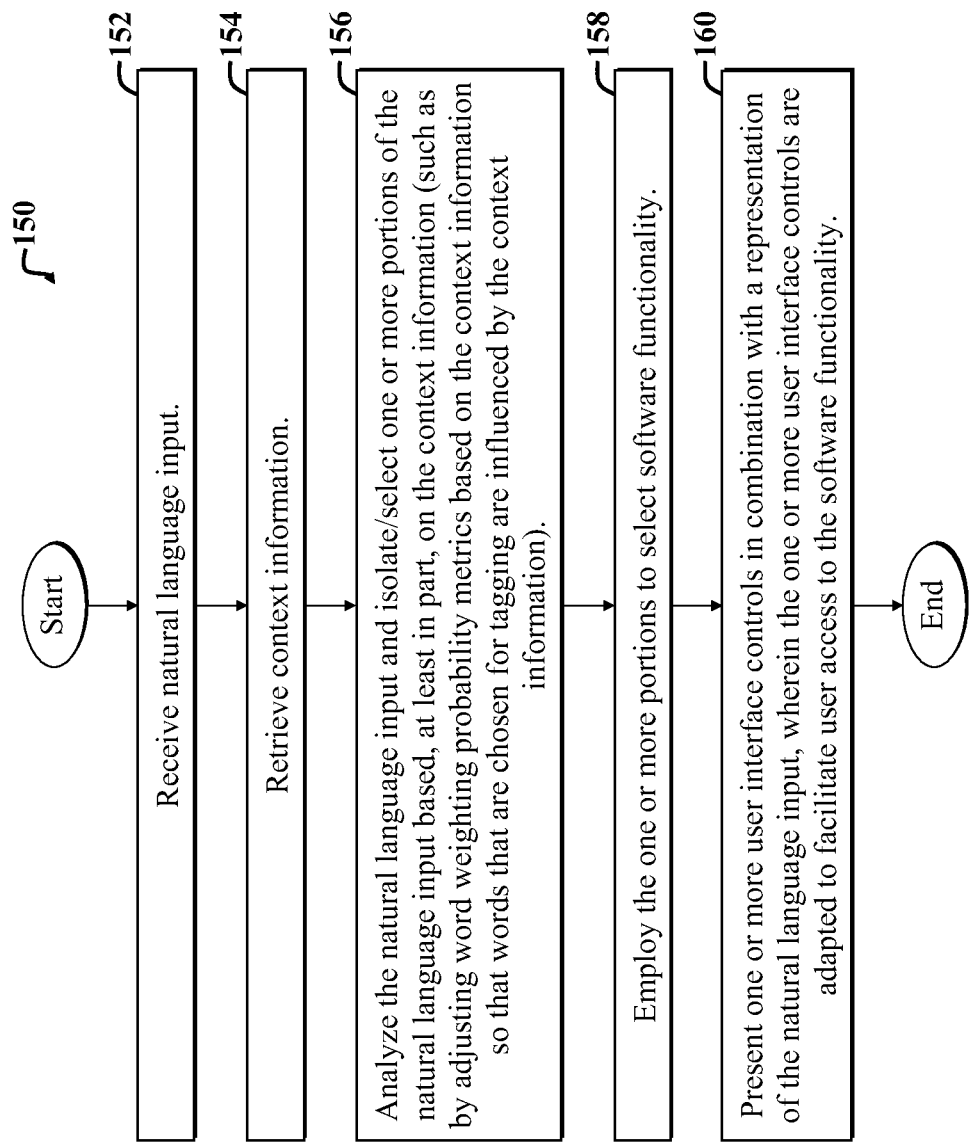
FIG. 9 is a flow diagram of a first example method adapted for use with the embodiments of FIGS. 1-8.

FIG. 9 is a flow diagram of a first example method 150 adapted for use with the embodiments of FIGS. 1-8. The example method 150 is adapted to facilitate user access to data and software functionality, and includes a first step 152, which involves receiving natural language input, e.g., speech that is to be or has been translated to electronic text, email content, notes, text messages, and so on.

A second step 154 includes retrieving context information.

A third step 156 includes analyzing the natural language input and isolating one or more portions of the natural language input in preparation for tagging. The isolated or selected portions may be based on the context information. For example, the context information may be employed to automatically adjust word and/or phrase weighting probability metrics based on the context information so that words and/or phrases that are chosen for tagging are heavily influenced by the context information.

A fourth step 158 includes employing the one or more portions to select software functionality.

A fifth step 160 includes presenting one or more user interface controls in combination with a representation of the natural language input, wherein the one or more user interface controls are adapted to facilitate user access to the software functionality.

Note that method 150 may be augmented or otherwise altered without departing from the scope of the present teachings. For example, the example method 150 may include automatically functionally augmenting the one or more keywords via in-line tagging of the one or more keywords via one or more user interface controls, resulting in functionally-augmented natural language in response thereto. Accordingly, such a method involves functionally augmenting a given instance of natural language input via use of tags, where the tags are selected by the underlying system, in part, based on context information used to inform the underlying system to facilitate estimating user intent from the provided natural language input.

The example method 150 may further include providing plural user options, e.g., a collection of user options, that vary according to the content of the natural language input.

The example method 150 may further include referencing user data to estimate user intent and employing an estimation of user intent to determine software functionality to associate with each of the one or more user interface controls, and tracking the referenced user data, which may include data access frequency, data access time, and data variability, of user access to the user data in addition to context information, such as user location information, calendar information and business cycle information. The tracked context information may trigger dynamic changes to word and/or phrase weighting probabilities to influence selection of words and/or phrases for tagging.

Additional example steps may include providing including providing a user option to change the one or more selections made in the step of employing, and providing a user option to specify a selection to be made in the step of employing.

Accordingly, the natural language input may represent notes that are selectively augmented with tags that may act as shortcuts for accessing software functionality and data objects, including business tasks, such as CRM opportunity management tasks. The underlying system can employ knowledge of user data and software usage history to consistently and accurately estimate what software functionality to associate with tagged keywords.

Although the description has been described with respect to particular embodiments thereof, these particular embodiments are merely illustrative, and not restrictive. For example, embodiments are not necessarily limited to enterprise applications. Virtually any type of software, not just enterprise software, can be augmented with mechanisms for tagging natural language input with tags that represent user interface controls for facilitating accessing underlying software functionality that may be related to portions of the natural language input.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium carrying program instructions thereon for a computing system, wherein the computing system comprises a natural language processing (NLP) server receiving user input from a graphical user interface and a speech-to-text converter in a client device, and wherein the instructions when executed by one or more processors in the computing system cause the one or more processors to perform operations comprising:
   in the NLP server, transcribing user input to text;
   associating each of one or more portions of the text with a keyword related to a database object;
   selecting the one or more portions of the text;
   employing the one or more portions to select software functionality relevant to the database object; and
   functionally augmenting the one or more portions of the text by presenting one or more user interface controls in combination with a representation of the text, wherein the one or more user interface controls includes a user selectable outline around each of the one or more portions of the text in combination with a drop-down menu.

2. The computer-readable storage medium of claim 1, wherein the one or more user interface controls are adapted to facilitate user access to the software functionality.

3. The computer-readable storage medium of claim 1, wherein the one or more user interface controls are in proximity to one or more portions of the text.

4. The computer-readable storage medium of claim 1, wherein the drop-down menu is in proximity to the user selectable outline.

5. The computer-readable storage medium of claim 1, wherein the one or more portions include one or more keywords occurring in a natural language.

6. The computer-readable storage medium of claim 1, wherein the instructions further cause the one or more processors to perform operations comprising:
   employing one or more of a client-side speech recognizer and a server-side speech recognizer to translate speech input to the text; and
   estimating user intent based on the text.

7. The computer-readable storage medium of claim 1, wherein the instructions further cause the one or more processors to perform operations comprising employing the one or more user interface controls to provide user options for accessing the software functionality in association with a single instance of the text.

8. The computer-readable storage medium of claim 1, wherein the instructions further cause the one or more processors to perform operations comprising employing the one or more user interface controls to provide user options for accessing the software functionality, and wherein the user options include a collection of user options that varies according to content of the text.

9. The computer-readable storage medium of claim 1, wherein the instructions further cause the one or more processors to perform operations comprising:
   estimating user intent based on user data; and wherein selecting the software functionality is based on the estimated user intent.

10. The computer-readable storage medium of claim 1, wherein the instructions further cause the one or more processors to perform operations comprising:
   estimating user intent based on user data; and
   determining the software functionality to associate with each of the one or more user interface controls based on the estimated user intent.

11. The computer-readable storage medium of claim 1, wherein the instructions further cause the one or more processors to perform operations comprising:
  functionally augmenting the text via in-line tagging of the text via the one or more user interface controls; and
  providing a user option to save a functionally augmented text representative of the text after the in-line tagging.

12. The computer-readable storage medium of claim 1, wherein the instructions further cause the one or more processors to perform operations comprising providing a user option to change one or more of the selections of the software functionality.

13. The computer-readable storage medium of claim 1, wherein the instructions further cause the one or more processors to perform operations comprising providing a user option to specify a selection of the software functionality.

14. The computer-readable storage medium of claim 1, wherein the instructions further cause the one or more processors to perform operations comprising:
  accessing enterprise data; and
  selecting the software functionality to associate with the text based on the enterprise data.

15. The computer-readable storage medium of claim 1, wherein the software functionality comprises a function to facilitate creation of a new business contact entry.

16. The computer-readable storage medium of claim 1, wherein the software functionality includes a function to facilitate modifying a database object.

17. The computer-readable storage medium of claim 1, wherein the instructions further cause the one or more processors to perform operations comprising employing one or more of a client-side speech recognizer and a server-side speech recognizer to translate speech input to the text.

18. A computing system comprising:
  natural language processing (NLP) server;
  a client device with a graphical user interface and a speech-to-text converter, wherein the NLP server is configured to receive user input from the graphical user interface and the speed-to-text converter;
  one or more processors; and
  software encoded in one or more non-transitory computer-readable media for execution by the one or more processors, and when executed operable to perform operations comprising:
  in the NLP server, transcribing user input to text
  associating each of one or more portions of the text with a keyword related to a database object;
  selecting the one or more portions of the text;
  employing the one or more portions to select software functionality relevant to the database object; and
  functionally augmenting the one or more portions of the text by presenting one or more user interface controls in combination with a representation of the text, wherein the one or more user interface controls includes a user selectable outline around each of the one or more portions of the text in combination with a drop-down menu.

19. A method for facilitating access to data and functionality in a computer system comprising a natural language processing (NLP) server receiving user input from a graphical user interface and a speech-to-text converter in a client device, the method comprising:
  in the NLP server, transcribing user input to text
  associating each of one or more portions of the text with a keyword related to a database object;
  selecting the one or more portions of the text;
  employing the one or more portions to select software functionality relevant to the database object; and
  functionally augmenting the one or more portions of the text by presenting one or more user interface controls in combination with a representation of the text, wherein the one or more user interface controls includes a user selectable outline around each of the one or more portions of the text in combination with a drop-down menu.

* * * * *

UNITED STATES PATENT AND TRADEMARK OFFICE
CERTIFICATE OF CORRECTION

Page 1 of 1

PATENT NO. : 10,152,301 B2
APPLICATION NO. : 14/951325
DATED : December 11, 2018
INVENTOR(S) : White et al.

It is certified that error appears in the above-identified patent and that said Letters Patent is hereby corrected as shown below:

In the Claims

In Column 20, Line 8, in Claim 18, delete "text" and insert -- text; --, therefor.

In Column 20, Line 25, in Claim 19, delete "text" and insert -- text; --, therefor.

Signed and Sealed this
Third Day of December, 2019

Andrei Iancu
*Director of the United States Patent and Trademark Office*